United States Patent
Kolesnik et al.

(10) Patent No.: US 10,423,433 B2
(45) Date of Patent: Sep. 24, 2019

(54) SCOPED NETWORK ADDRESS POOL MANAGEMENT

(71) Applicant: Red Hat Israel, Ltd., Raanana (IL)

(72) Inventors: Michael Kolesnik, Raanana (IL); Mordechay Asayag, Raanana (IL)

(73) Assignee: Red Hat Israel, Inc., Raanana (IL)

( * ) Notice: Subject to any disclaimer, the term of this patent is extended or adjusted under 35 U.S.C. 154(b) by 326 days.

(21) Appl. No.: 14/628,511

(22) Filed: Feb. 23, 2015

(65) Prior Publication Data
US 2016/0248726 A1 Aug. 25, 2016

(51) Int. Cl.
*G06F 9/455* (2018.01)
*H04L 29/12* (2006.01)

(52) U.S. Cl.
CPC ...... *G06F 9/45533* (2013.01); *G06F 9/45558* (2013.01); *H04L 61/2007* (2013.01); *H04L 61/2061* (2013.01); *G06F 2009/45595* (2013.01); *H04L 61/2038* (2013.01); *H04L 61/6022* (2013.01); *H04L 61/6095* (2013.01)

(58) Field of Classification Search
CPC .................................................. G06F 9/45533
See application file for complete search history.

(56) References Cited

U.S. PATENT DOCUMENTS

| | | | | |
|---|---|---|---|---|
| 5,940,396 A * | 8/1999 | Rochberger | ....... | H04Q 11/0478 370/256 |
| 6,085,238 A * | 7/2000 | Yuasa | ................. | H04L 12/4641 370/409 |
| 8,104,033 B2 * | 1/2012 | Chiaramonte | ........ | G06F 9/5077 718/1 |
| 8,589,554 B2 | 11/2013 | Kelkar et al. | | |
| 8,595,378 B1 * | 11/2013 | Cohn | .................. | H04L 65/4076 709/238 |
| 8,700,811 B2 | 4/2014 | Oshins et al. | | |
| 2004/0057443 A1 * | 3/2004 | Kim | .................. | H04L 29/12009 370/401 |
| 2006/0159095 A1 * | 7/2006 | Cook | ..................... | H04L 45/04 370/392 |
| 2011/0022694 A1 | 1/2011 | Dalal et al. | | |

(Continued)

FOREIGN PATENT DOCUMENTS

| | | |
|---|---|---|
| CN | 103685608 | 3/2014 |
| CN | 103731514 | 4/2014 |

OTHER PUBLICATIONS

"Configuring Logical Networking in VMM Overview"; http://technet.microsoft.com/en-us/library/jj721568.aspx, Nov. 1, 2013, 7 pages.

(Continued)

*Primary Examiner* — Esther B. Henderson
(74) *Attorney, Agent, or Firm* — Lowenstein Sandler LLP

(57) ABSTRACT

Systems and methods for storing and managing pools of network addresses. An example method may comprise: receiving, by a processing device, a request for a network address to be associated with a network interface of a machine, wherein the machine is represented by one of: a virtual machine or a computer system; identifying a hierarchy of groups that include the machine; searching the hierarchy of groups to identify a group having an associated pool of network addresses; and selecting a network address from the pool of network addresses.

20 Claims, 4 Drawing Sheets

(56) References Cited

U.S. PATENT DOCUMENTS

2013/0263120 A1* 10/2013 Patil .................. G06F 9/45558
718/1
2014/0025821 A1  1/2014 Baphna et al.
2015/0172190 A1*  6/2015 Song .................. H04L 12/4641
370/390

OTHER PUBLICATIONS

Maurer, Thomas, "Basic Hyper-V Networking in System Center 2012 SP1—Virtual Machine Manager"; http://www.thomasmaurer.ch/2013/02/basic-hyper-v-networking-in-system-center-2012-sp1-virtual-machine-manager/; Feb. 11, 2013; 7 pages.
"How to Create IP Address Pools for Logical Networks in VMM"; http://technet.microsoft.com/en-us/library/gg610590.aspx; Nov. 1, 2013; 3 pages.
"How to Create IP Address Pools for VM Networks in VMM"; http://technet.microsoft.com/en-us/library/jj721574.aspx, Nov. 1, 2013, 2 pages.

\* cited by examiner

SCOPED NETWORK ADDRESS POOL MANAGEMENT

TECHNICAL FIELD

The present disclosure is generally related to virtualized computer systems, and is more specifically related to systems and methods for managing pools of network addresses.

BACKGROUND

A network address may be a unique value associated with a network interface to distinguish the network interface from other network interfaces in a computer network. The network address may take the form of a Media Access Control (MAC) address and may be assigned by a computing device manufacturer when a physical network interface card is created. In a virtualized environment, there may be both physical network interfaces and virtual network interfaces. Virtual network interfaces may be an abstract representation of a physical network interface and may be associated with a virtual machine. The virtual network interface may be generated during or after the creation of a virtual machine and may appear to operate similar to a physical network interface. Millions of virtual network interfaces may be dynamically generated within a data center and each may be associated with a network address that is unique to a particular computer network.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
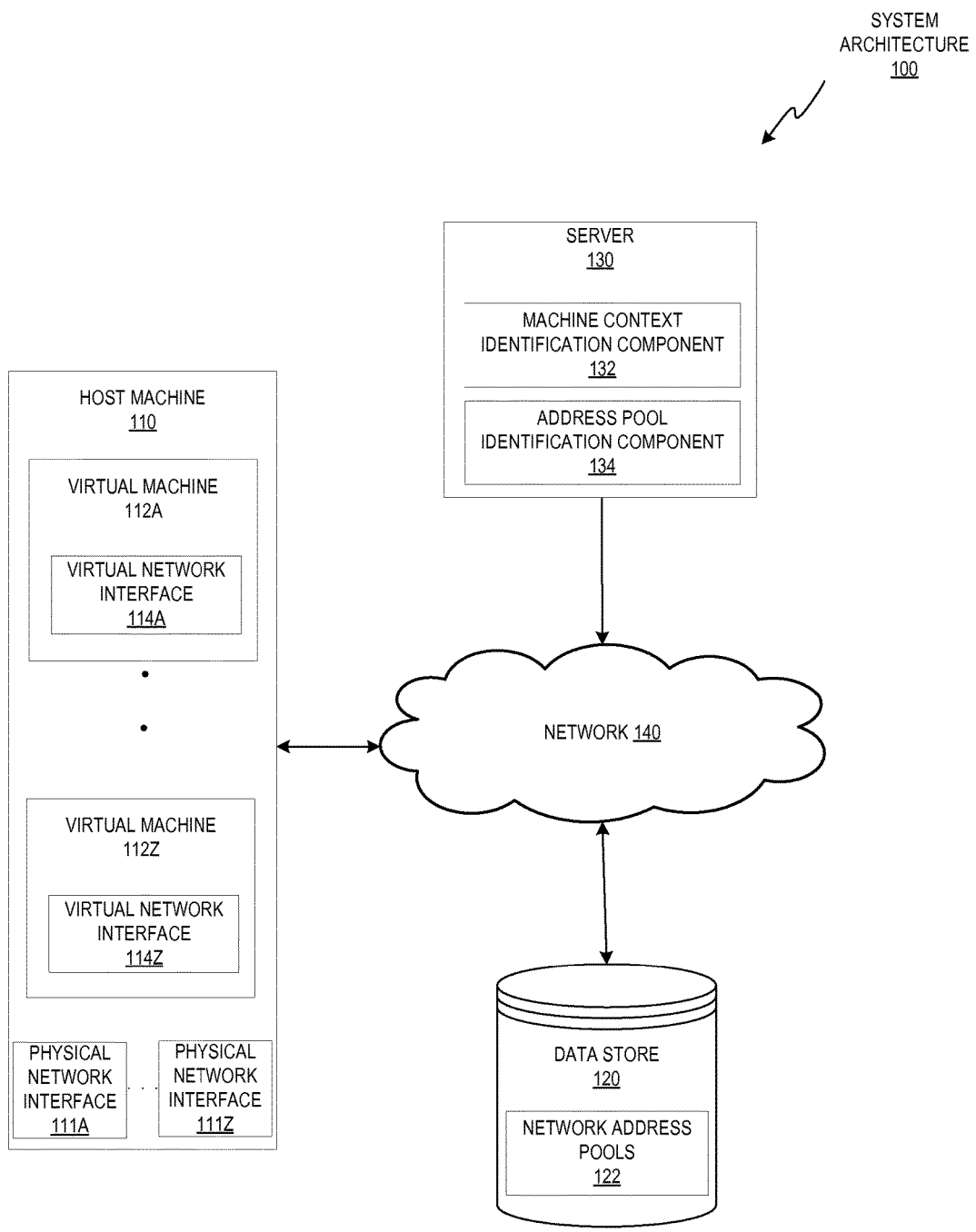
FIG. 1 depicts a high-level diagram of an example system architecture in accordance with one or more aspects of the present disclosure.

Described herein are methods and systems for managing pools of network addresses. "Network address" herein shall refer to an identifier that is associated with a network interface and may distinguish the network interface from other network interfaces on a computer network. The network address may be associated with network messages, such as a network frames or data packets and may be used to identify a source network interface or a destination network interface. In one example, a network address may be an OSI layer 2 network address (e.g., MAC address) and may be assigned to a physical or virtual network interface. In another example, the network address may be an OSI layer 3 network address (e.g., IP address).

"Group" herein shall refer to a particular way of organizing machines (e.g. virtual machines and computer systems). Each group may include other groups or machines or a combination thereof. The groups may be arranged in a "Hierarchy of groups" which herein shall refer to a particular way of organizing groups. In one example, a hierarchy may include a top-level group (e.g., global group) and a series of sub-groups at different levels of the hierarchy.

In accordance with one or more aspects of the present disclosure, a virtual data center or a cloud infrastructure may have a large number of virtual machines (e.g., several thousand VMs) and each of the virtual machines may have one or more virtual network interfaces for communicating with other virtual and physical machines. The communications may be transmitted over one or more physical or virtual networks within the virtual data center.

Aspects of the present disclosure may enhance the security and performance of the virtual data center by utilizing a hierarchy of groups associated with multiple network address pools and a method for selecting network addresses from the pools. The hierarchy of groups may have multiple groups spread across multiple levels. At a top level there may be a global group (e.g., data center) followed by sub-groups (e.g., clusters) at a lower level. Each group may include individual VMs or groups of VMs (e.g., pools or sub-clusters). Each VM may be associated with multiple groups at each level of the hierarchy, for example, a specific VM may be associated with a first group (e.g., VM pool) within a second group (e.g., cluster) of a third group (e.g., datacenter) and some or all of the groups may be associated with their own pool of network addresses.

The method for selecting a network address may involve utilizing the context of a machine to identify a hierarchy of groups associated with the machine and searching the groups for a pool of network addresses. In one example, the method may search the hierarchy for the lowest group (e.g., narrowest scope) having a pool of network addresses. The availability of addresses within the pool may determine whether a new network interface or new virtual machine can be created and if created what network address will be used. This may enhance performance because, for example, it may reduce the pool of available addresses and therefore reduce the quantity of network interfaces on a network. Reducing the pool may also enhance security by enabling the use of traffic rules (e.g. Firewall rules) on a virtual or physical network for the range of addresses. The traffic rules may be more strict (e.g., secure) than default rules or rules applied to other address pools.

Various aspects of the above referenced methods and systems are described in details herein below by way of examples, rather than by way of limitation.

FIG. 1 illustrates an example system 100, in accordance with an implementation of the disclosure. The system 100 includes host machine 110, a data store 120, a server 130 and a network 140. In one implementation, network 140 may include a public network (e.g., the Internet), a private network (e.g., a local area network (LAN) or wide area network (WAN)), a wired network (e.g., an Ethernet network), a wireless network (e.g., an 802.11 network or a Wi-Fi network), a cellular network (e.g., a Long Term Evolution (LTE) network), routers, hubs, switches, server computers, and/or a combination thereof.

Host machine 110 may be a physical machine (e.g., computing system) that provides virtualization for virtual machines 112A-Z. Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Network interface virtualization may be implemented by the hypervisor and may provide virtual machines 112A-Z access to physical network interfaces 111A-Z via virtual network interfaces 114A-Z.

Physical network interfaces 111A-Z may be computer hardware components that connect host 110 to computer to network 140. Each computer hardware component may be a network interface controller (NIC) that supports a specific physical layer and data link layer standard such as Ethernet, Fibre Channel, Wi-Fi, Token Ring or other similar networking protocol. The physical network interfaces 111A-Z may be associated with one or more network addresses that are associated with different networking layers. For example, a physical network interface may be associated with an OSI layer 2 address, which may be represented by a link layer address (e.g., a MAC address) as well as one or more network addresses at a different OSI layers, such as layer 3 (an Internet Protocol (IP) address).

Virtual network interfaces 112A-Z may be an abstract representation of a computer network interface. Each virtual network interface may or may not correspond to a physical network interface, for example, some virtual network interfaces may be associated with physical network interfaces where as other virtual network interfaces may only be used for communicating between multiple VMs on a host and therefore may not be associated with a physical network interface. Each of virtual network interfaces 111A-Z may be associated with one or more network addresses of one or more ISO model layers, for example, a virtual network interface may be associated with an OSI layer two 2 address, which may be represented by a link layer address (e.g., a MAC address). In another example, a virtual network interface may be further associated with one or more network addresses at different OSI layers, such as one or more ISO layer 3 addresses (e.g., Internet Protocol (IP) addresses).

Virtual network interfaces 112A-Z may be created when a virtual machine is generated (e.g., virtual machine image creation) or when the virtual machine is instantiated (e.g., executed). Virtual network interfaces 112A-Z may also be generated during the operation of the virtual machine, for example, a user may log into a virtual machine and initiate the creation of a new virtual network interface while the virtual machine is running. When a virtual network interface is generated it may be associated with a network address from a pool of network addresses, such as network addresses pool 122. The network address may be associated with (e.g., assigned to) the network interface before, after or during the generation of network interface.

Network address pool 122 may be a set of network address and the set may be associated with one or more groups of machines. Network address pool 122 may be stored in data store 120 and may include multiple network addresses within one or more ranges of network addresses. Each range of network addresses may have a start network address and an end network address and may include at least some network addresses there between. Not every address in a pool or a range may be eligible to be assigned to a network interface: for example, some network addresses may not be assigned because they are designated for a special purpose, such as a broadcast or multicast network address.

Server 130 may identify available network addresses from network address pools 122 and may associate the network addresses with network interfaces. In one example, server 130 may be an orchestration server or function similar to an orchestration server and create and/or configure virtual machine images. A virtual machine image may be a file or structure that may include disk images of a virtual machine and may be accessed by host server 110 and may be used to instantiate one or more virtual machines 112A-Z. Server 130 may receive a request to create a new virtual machine or a new virtual network interface for an existing machine, and may process the request to identify a network address. In another example, server 130 may receive a request for configuration information (e.g., network address) and may transmit the configuration information to an external system.

Server 130 may identify a network address by utilizing a machine context identification component 132 and a pool identification component 134. Machine context identification component 132 may identify the machine associated with the network address request and may identify the hierarchy of groups that include the machine. Determining the machine context may include identifying which groups the machine is associated with, for example, which data center, which cluster and which pool the machine is associated with.

Address pool identification component 134 may use the group context (e.g., hierarchy of groups to identify a specific pool of addresses. This may involve iterating through a plurality of groups until a group that has an address pool is identified. In one example, this may begin at the lowest and most granular group of the group hierarchy, for example, group three (e.g., machine pool) and may iterate one group at a time until a group with a pool of addresses is located (e.g., first group). In another example, address pool identification component 134 may begin at any other group within the hierarchy and may iterate through multiple groups (e.g., every group) to determine which groups are associated with network address pools and may select the narrowest group having a network address pool. In other examples, other address pool identification algorithms may be used.

Figure 2A:
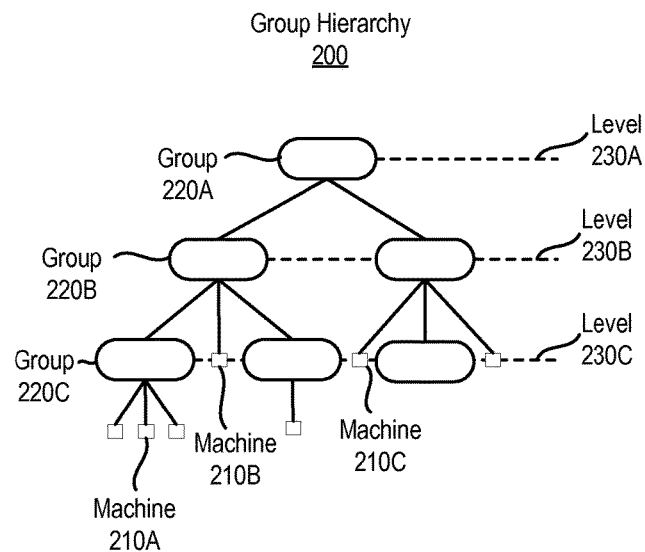
FIGS. 2A and 2B depict block diagrams of an illustrative embodiment of a hierarchy of groups for organizing machines in accordance with one or more aspects of the present disclosure.
Figure 2B:
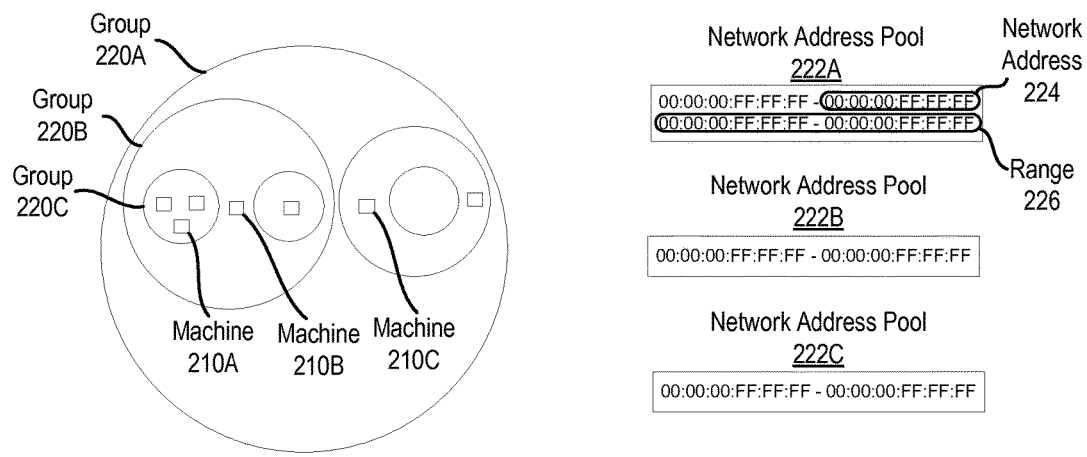

FIGS. 2A and 2B depict block diagrams of an exemplary group hierarchy 200 that includes multiple virtual machines spread between multiple groups. FIG. 2A illustrates a hierarchy that resembles a tree structure with multiple levels. FIG. 2B illustrates that the groups may have different scopes and may be nested within one another and that a virtual machine may be within the scope of multiple groups at different levels of the hierarchy.

Referring to FIG. 2A, group hierarchy 200 may include machines 210A-C, groups 220A-C, and levels 230A-C. Machines 210A-C may include virtual machines, physical machines (e.g., computer systems) or other similar machine or combination thereof. Groups 220A-C may be used to organize machines 210A-C and may include one or more groups or one or more machines or a combination thereof. Groups may be arranged in a hierarchy, which may be a particular way of organizing groups in which the groups or machines are represented as being above, below or at the same level as one another. In one example, the hierarchical arrangement may be similar to a tree and in other examples the hierarchical arrangement may be similar to a star arrangement or other arrangement.

Levels 230A-C may indicate the relationship of the group to other groups. Level 230A may be a top level (e.g., parent level, first level) and a group at this level may be a global group (e.g., group 220A). A global group may include all of the groups and machines below it. Level 230B and level 230C may be sub-levels below level 230A and groups within these groups may be considered sub-groups of the global group. In one example, groups at level 230A may represent a data center, the groups at level 230B may represent clusters and groups at level 230C may represent pools of machines. Although the data center may include one or more clusters and each cluster may include one or more machine pools, in other examples, a data center may not include any clusters or a cluster may not include any pools.

A data center (e.g., group 220A) may be a logical container for all physical and virtual resources within a managed virtual environment which may include host systems, storage systems and network communication systems, as well as virtual resources associated with these systems. The data center may be based on a cloud platform such as OpenStack™ and may function as a public cloud, private cloud, or hybrid. The public cloud may be a cloud service that is accessible to the public for example, this may include Amazon's Elastic Compute Cloud™ (ECC), Microsoft's Azure™ service, or Google's Compute Engine™, or other similar cloud service. A private cloud may be similar to a public cloud but may be operated for a single organization and may be hosted and or managed by the organization or by a third-party. A hybrid cloud may be a cloud computing service that is composed of a combination of private, public and community cloud services, from different service providers.

A cluster (e.g., group 220B) may include a set of interconnected machines that run on the same or similar type of computing hardware. The type of computing hardware may be based on the manufacturer or instruction set architecture or some combination thereof, for example, Intel x86, AMD x86, IBM PowerPC, and SPARC may be different type of computing hardware. Each member of the cluster may also have access to the same networks and storage domains and may function together to complete tasks.

A machine pool (e.g., group 220A) may be similar to a cluster in that all members of a machine pool may be based on the same computing hardware however members of a machine pool may also have the same or similar type of computing software. The type of computing software may be based on the operating system (e.g., Linux®, Microsoft® Windows®, Unix), web server (e.g., Red Hat Jboss, Microsoft Internet Information Services (IIS), IBM Websphere), database management system (e.g., Oracle MySQL, IBM DB2, MariaDB) or other components of a software stack. In one example, virtual machines within a machine pool may be generated based on a template. The template may be a model virtual machine with predefined settings. A virtual machine that is based on a particular template acquires the settings of the template.

In other examples, there may be more or less groups and the groups may represent other logical entities. There may also be more or less levels and the levels may be reversed in which case the top level may include groups with the narrowest scope and the bottom level may include groups with the broadest scope or some combination thereof.

Referring now to FIG. 2B, group hierarchy 200 may be represented using a circular diagram to help illustrate that groups at different levels of group hierarchy 200 may have different scopes and may be nested within one another. Group 220A-C shown in FIG. 2B may be the same as Group 220A-C in FIG. 2A. Group 220A may have the broadest scope as shown by its corresponding circle having the largest diameter. Group 220B may have a narrower scope and may therefore be represented by smaller diameter circles. Group 220C may be the group with the narrowest scope. Group 220A-B may be nested groups because group 220C may be included within group 210B which may be included within group 220C.

Each of machines 210A-C may be associated with one or more groups, which may be used to define the context of the machine. The context of the machine may be a list of groups for which the machine is a member. For example, machine 210A may be a member of group 220A-C, whereas machine 210B may be a member of groups 220A and 220B without being a member of group C.

Each group within group hierarchy 200 may have a network address pool associated with it. For example, group 220A may be associated with network address pool 222A and group 220B may be associated with network address pool 222B and group 220C may be associated with network address pool 222C. Each pool of network addresses may include one or more ranges 226 of network addresses 224. Range 226 may begin at starting network address and may extend to an end network address. Each network address may comprise a unique identifier of any size, for example, 48 bit, 64 bit 128 bit or any other size. As shown in FIG. 2B, the network address 224 may be a MAC address and may be visually represented as six groups of two hexadecimal digits, which may be separated by colons or hyphens. In other examples, the network address may be any network identifier at any networking layer, such as an IP address or network port number.

Figure 3:
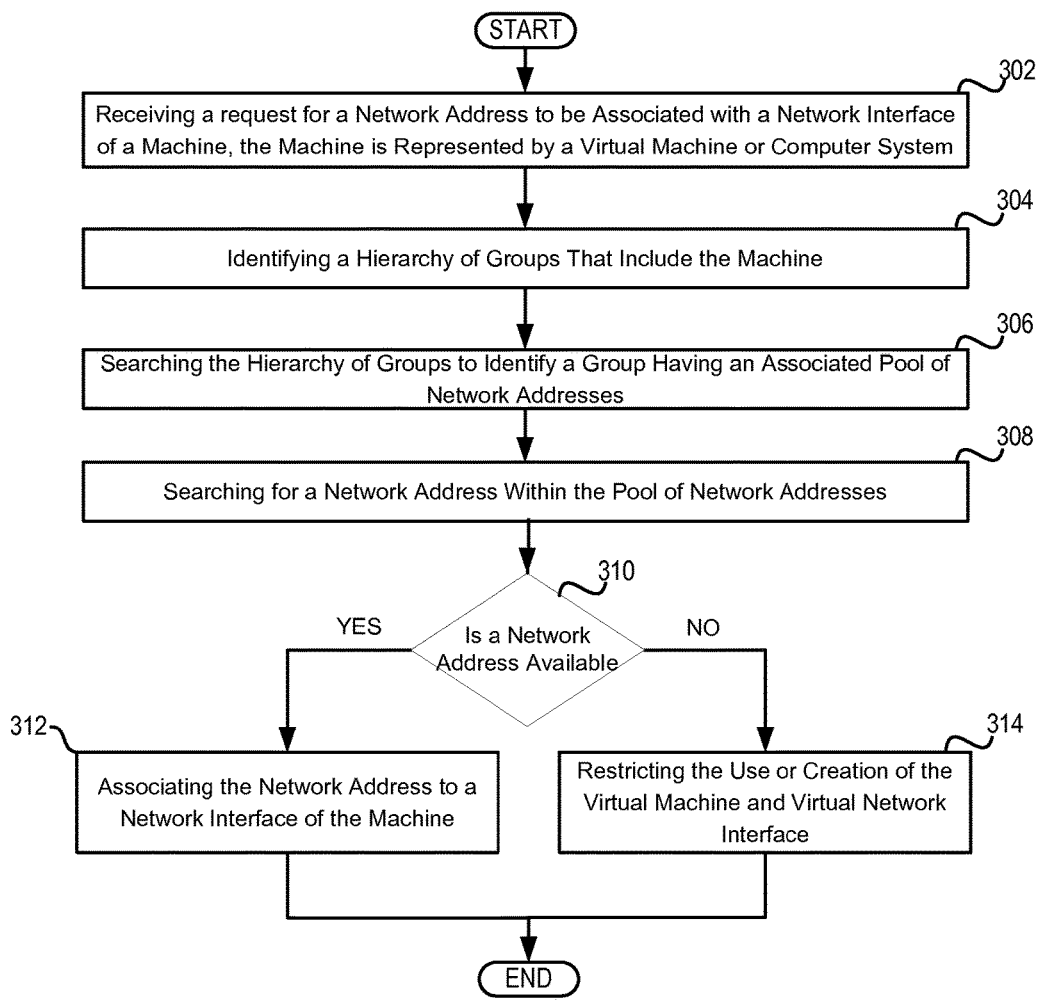
FIG. 3 depicts a flow diagram of an example method for scoped network address pool management in accordance with one or more aspects of the present disclosure.

FIG. 3 depicts a flow diagram of one illustrative example of a method 300 for scoped network address pool management, in accordance with one or more aspects of the present disclosure. Methods 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by machine content identification component 132 and address pool identification component 134 as shown in FIG. 1.

Method 300 may begin at block 302 when the processing device performing the method may receive a request for a network address to be associated with a network interface of a machine. The request for a network address may be initiated in response to a request to create or modify a virtual machine. The request to create or modify a virtual machine may have been initiated by a user (e.g., IT administrator, cloud consumer) or another component of the data center, such as a load balancing or provisioning or other similar component.

At block 304 the processing device may identify a hierarchy of groups that include the machine. The hierarchy of groups may include a group at a first level and a group at a second level. The group at the first level may include the group at the second level and the second group may include machines that are associated with both the first group and the second group. In one example, the hierarchy of groups may include at least three groups corresponding respectively to a data center, a cluster and a pool of virtual machines.

At block 306, the processing device may search the hierarchy of groups to identify a group having an associated pool of network addresses. The pool of network addresses may include at least one of: a range of media access control (MAC) addresses or a range of internet protocol (IP) addresses. The machine groups within the hierarchy of groups may be associated with a variety of pools of network addresses. In one example, each machine group of the hierarchy of groups may be associated with a different pool of network addresses. In other examples, only some of the machine groups may be associated with a pool of network addresses and other machine groups may not have their own pool of network addresses.

Searching the hierarchy of groups may involve the processing device analyzing a first machine group of the hierarchy of groups to determine whether the first machine group comprises a pool of network addresses and analyzing a second machine group from the hierarchy of groups in response to determining the first machine group is not associated with a pool of network addresses. This may continue until a group that is associated with a pool is identified at which point, for example, the second machine group may be identified as the machine group associated with the pool of network addresses. In one example, the method may begin at the first machine group, which may have a narrower scope than the second machine group.

At block 308, the processing device may select a network address from the pool of network addresses. Selecting a network address may involve performing a search of the pool of network addresses identified at block 306. In one example, the search may be a linear search that may begin at the starting address of the pool and may end at either the first network address that is available state or the last network address when no network addresses are available. In another example, the search may begin at a randomly selected network address within the network pool and iterate through the pool until an available address is identified or all the network address within the pool are checked.

At block 310, the processing device may determine whether there is a network address available. When a network address is available, the processing device may proceed to block 312 and may associate the network address to a network interface of the machine. In one example, associating the network address to a network interface may involve assigning the network address to a virtual network interface by updating a data structure or configuration file associated with the network interface. When there are no network addresses available within the pool of network addresses, the processing logic may proceed to block 314.

At block 314, the processing device may restrict the use or creation of the virtual network interface or virtual machine or a combination of both. In one example, responsive to failing to select an available network address from the pool of network addresses the processing device may abort a creation of the virtual machine. In another example, the processing device may restrict the creation of an additional virtual machine or the creation of an additional virtual network interface. This may still hold true even though other groups associated with the machine may have pools with available network addresses.

In other examples, the pool of network addresses may be associated with a user quota that restricts the amount of network addresses associated with machines with the user. For example, the pool of addresses may include thousands of available addresses but the user may be restricted to using a subset of the pool's network addresses (e.g., 10, 100, 1000 addresses). When the user attempts to exceed the quota the processing device may handle the situation similar to block 314 and restrict the use or creation of the virtual network interface and or virtual machine. Responsive to completing the operations described herein above with references to block 418 the method may terminate.

Figure 4:
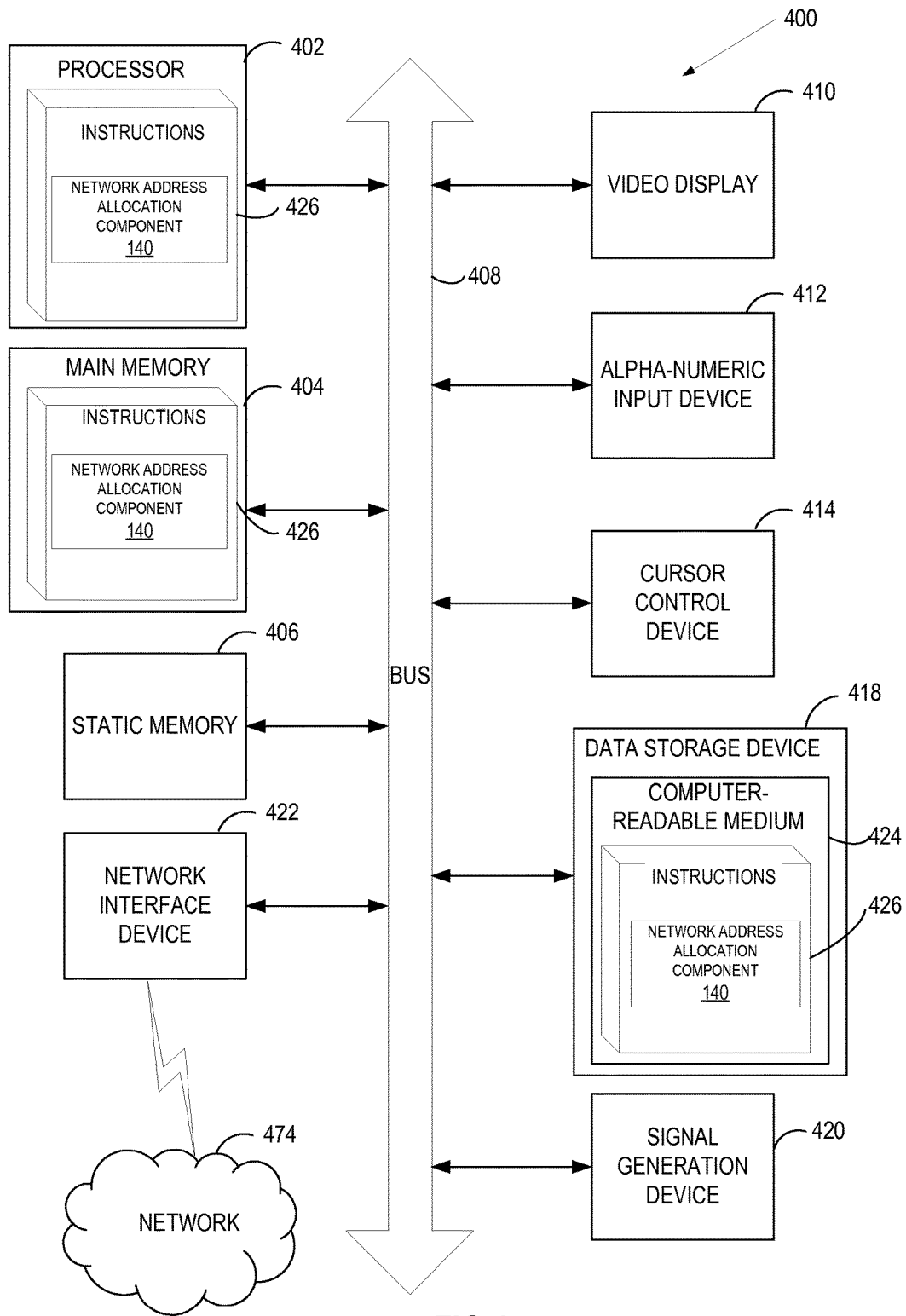
FIG. 4 depicts a block diagram of a computer system operating in accordance with one or more aspects of the present disclosure.

FIG. 4 depicts a block diagram of a computer system operating in accordance with one or more aspects of the present disclosure. In various illustrative examples, computer system 400 may correspond to example system architecture 100 of FIG. 1.

In certain implementations, computer system 400 may be connected (e.g., via a network, such as a Local Area Network (LAN), an intranet, an extranet, or the Internet) to other computer systems. Computer system 400 may operate in the capacity of a server or a client computer in a client-server environment, or as a peer computer in a peer-to-peer or distributed network environment. Computer system 400 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 400 may include a processor 402, a volatile memory 404 (e.g., random access memory (RAM)), a non-volatile memory 406 (e.g., read-only memory (ROM) or electrically-erasable programmable ROM (EEPROM)), and a data storage device 416, which may communicate with each other via a bus 408.

Processor 402 may be provided by one or more processing devices such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 400 may further include a network interface device 422. Computer system 400 also may include a video display unit 410 (e.g., an LCD), an alphanumeric input device 412 (e.g., a keyboard), and a cursor control device 414 (e.g., a mouse).

Data storage device 416 may include a non-transitory computer-readable storage medium 424 on which may store instructions 426 encoding any one or more of the methods or functions described herein, including instructions encoding machine context identification component 132 or address pool identification component 114 of FIG. 1 implementing method 300.

Instructions 426 may also reside, completely or partially, within main memory 404 and/or within processor 402 during execution thereof by computer system 400, hence, main memory 404 and processor 402 may also constitute machine-readable storage media.

While computer-readable storage medium 424 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general-purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    receiving, by a processing device, a request for a network address for a network interface of a virtual machine;
    identifying a hierarchy of groups associated with the virtual machine, wherein the virtual machine is included in a plurality of groups of the hierarchy of groups and wherein the plurality of groups are at different levels of the hierarchy;
    analyzing, by the processing device, the plurality of groups based on the hierarchy, wherein the analyzing determines that a first group at a first level of the hierarchy lacks a pool of network addresses that comprises an available network address;
    determining, by the processing device, that a second group at a second level of the hierarchy is associated with a pool of network addresses comprising at least one available network address; and
    selecting, in view of the analyzing and the determining, the network address for the network interface of the virtual machine from the pool of network addresses associated with the second group at the second level of the hierarchy.

2. The method of claim 1, wherein the second group at the second level comprises the first group at the first level and wherein a plurality of virtual machines are associated with the first group at the first level and the second group at the second level.

3. The method of claim 1, wherein the analyzing comprises searching the hierarchy of groups for an available network address and comprises:
    responsive to determining that the first group of the hierarchy of groups is not associated with a pool of network addresses, identifying the second group of the hierarchy of groups, wherein the first group is associated with a narrower scope than the second group.

4. The method of claim 1, wherein the pool of network addresses comprises at least one of: a range of media access control (MAC) addresses or a range of internet protocol (IP) addresses.

5. The method of claim 1, wherein the hierarchy of groups comprises at least three groups corresponding respectively to a data center, a cluster, and a pool of virtual machines.

6. The method of claim 1, wherein at least two groups of the hierarchy of groups are associated with different pools of network addresses.

7. The method of claim 1, further comprising: responsive to failing to select an available network address from a pool of network addresses associated with a third group at a third level of the hierarchy, aborting a creation of the virtual machine.

8. The method of claim 1, wherein the pool of network addresses is associated with a user quota that restricts the amount of network addresses associated with a user.

9. A system comprising:
a memory;
a processing device communicably coupled to the memory, the processing device to:
receive a request for a network address for a network interface of a virtual machine;
identify a hierarchy of groups associated with the virtual machine, wherein the virtual machine is included in a plurality of groups of the hierarchy of groups and wherein the plurality of groups are at different levels of the hierarchy;
analyze the plurality of groups based on the hierarchy, wherein the analyzing determines a first group at a first level of the hierarchy lacks a pool of network addresses that comprises an available network address;
determine that a second group at a second level of the hierarchy is associated with a pool of network addresses comprising at least one available network address; and
select the network address for the network interface of the virtual machine from the pool of network addresses associated with the second group at the second level of the hierarchy.

10. The system of claim 9, wherein the second group at the second level comprises the first group at the first level and wherein a plurality of virtual machines are associated with the first group at the first level and the second group at the second level.

11. The system of claim 9, wherein the analysis comprises searching the hierarchy of groups for an available network address and comprises the processing device to:
identify the second group of the hierarchy of groups responsive to determining that the first group is not associated with a pool of network addresses, wherein the first group is associated with a narrower scope than the second group.

12. The system of claim 9, wherein the pool of network addresses comprises at least one of: a range of media access control (MAC) addresses or a range of internet protocol (IP) addresses.

13. The system of claim 9, wherein the hierarchy of groups comprises at least three groups corresponding respectively to a data center, a cluster, and a pool of virtual machines.

14. The system of claim 9, wherein at least two groups of the hierarchy of groups are associated with different pools of network addresses.

15. The system of claim 9, further comprising: responsive to failing to select an available network address from a pool of network addresses associated with a third group at a third level of the hierarchy of groups, aborting a creation of the virtual machine.

16. The system of claim 9, wherein the pool of network addresses is associated with a user quota that restricts the amount of network addresses associated with a user.

17. A non-transitory machine-readable storage medium storing instructions that cause a processing device to:
receive a request for a network address for a network interface of a virtual machine;
identify a hierarchy of groups associated with the virtual machine, wherein the virtual machine is included in a plurality of groups of the hierarchy of groups and wherein the plurality of groups are at different levels of the hierarchy;
analyze the plurality of groups based on the hierarchy, wherein the analyzing determines that a first group at a first level of the hierarchy lacks a pool of network addresses that comprises an available network address;
determine that a second group at a second level of the hierarchy is associated with a pool of network addresses comprising at least one available network address; and
select the network address for the network interface of the virtual machine from the pool of network addresses associated with the second group at the second level of the hierarchy.

18. The non-transitory machine-readable storage medium of claim 17, wherein the second group at the second level comprises the first group at the first level and wherein a plurality of virtual machines are associated with the first group at the first level and the second group at the second level.

19. The non-transitory machine-readable storage medium of claim 17, wherein to analyze comprises searching the hierarchy of groups for an available network address and comprises instructions that further cause the processing device to:
identify the second group of the hierarchy of groups responsive to determining that the first group is not associated with a pool of network addresses, wherein the first group is associated with a narrower scope than the second group.

20. The non-transitory machine-readable storage medium of claim 17, wherein the pool of network addresses comprises at least one of: a range of media access control (MAC) addresses or a range of internet protocol (IP) addresses.

* * * * *